United States Patent [19]

Jensen

[11] Patent Number: 5,293,499
[45] Date of Patent: Mar. 8, 1994

[54] APPARATUS FOR EXECUTING A RISC STORE AND RI INSTRUCTION PAIR IN TWO CLOCK CYCLES

[75] Inventor: Eric H. Jensen, Livermore, Calif.

[73] Assignee: Sun Microsystems, Inc., Mountain View, Calif.

[21] Appl. No.: 588,494

[22] Filed: Sep. 21, 1990

Related U.S. Application Data

[63] Continuation of Ser. No. 458,576, Dec. 29, 1989, abandoned.

[51] Int. Cl.$^5$ ............................................. G06F 9/28
[52] U.S. Cl. ............................... 395/375; 364/232.23; 364/262.4; 364/263; 364/263.1; 364/DIG. 1
[58] Field of Search ............... 395/375, 725, 775; 364/DIG. 1, 232.23, 228.7, 231.9

[56] References Cited

U.S. PATENT DOCUMENTS

| | | | |
|---|---|---|---|
| 3,949,379 | 4/1976 | Ball | 364/200 |
| 4,402,042 | 8/1983 | Guttag | 364/200 |
| 4,476,525 | 10/1984 | Ishii | 395/375 |
| 4,639,886 | 1/1987 | Hashimoto et al. | 364/736 |
| 4,656,578 | 4/1987 | Chilinski et al. | 364/200 |
| 4,685,058 | 8/1987 | Lee et al. | 395/375 |
| 4,734,852 | 3/1988 | Johnson et al. | 364/200 |
| 4,766,566 | 8/1988 | Chuang | 364/900 |
| 5,041,968 | 8/1991 | Yamaguchi | 395/725 |
| 5,088,035 | 2/1992 | Gardei et al. | 395/375 |
| 5,136,696 | 8/1992 | Beckwith et al. | 395/375 |
| 5,185,870 | 2/1993 | Lenoski | 395/375 |
| 5,193,158 | 3/1993 | Kinney et al. | 395/375 |

Primary Examiner—Thomas C. Lee
Assistant Examiner—Maria N. Von Buhr
Attorney, Agent, or Firm—Blakely Sokoloff Taylor & Zafman

[57] ABSTRACT

A processor for a SPARC based RISC computer including a central processing unit including a register file having a pair of read ports and a write port, an instruction register for holding an instruction including addresses of registers to be read and written to, a multiplexor, and apparatus for controlling the multiplexor to transfer the address from a write position of the instruction register to the register file such that the information stored in the addressed register is transferred out of the register file through one of the read ports on the clock cycle following a store instruction.

6 Claims, 2 Drawing Sheets

APPARATUS FOR EXECUTING A RISC STORE AND RI INSTRUCTION PAIR IN TWO CLOCK CYCLES

This is a continuation of application Ser. No. 07/458,576, filed Dec. 29, 1989, now abandoned.

BACKGROUND OF THE INVENTION

1. Field of the Invention

This invention relates to computers and, more particularly, to methods and apparatus for accelerating store operations in reduced instruction set computers.

2. History of the Prior Art

The development of digital computers progressed through a series of stages beginning with processors which were able to process only a few basic instructions and in which the programming needed to be done at a machine language level. Development continued to a point where processors were capable of handling very complicated instructions written in high level languages. At least one of the reasons for this development is that high level languages are easier for programmers to use, thereby rapidly increasing the development of new programs. Another reason is that up to some point in the development of digital computers the more advanced machines were capable of executing operations more rapidly.

There came a point, however, where the constant increase in the ability of the computers to run more complicated instructions actually began to slow the operation of the computer over what investigators felt was possible with machines operating with only a small number of basic instructions. These investigators began to design advanced machines for running a limited number of instructions, a so-called reduced instruction set, and were able to demonstrate that these machines did, in fact, operate more rapidly for some types of operations. Thus began the reduced instruction set computer which has become known by its acronym, RISC.

The central processing unit of the typical RISC computer is very simple. It fetches an instruction every clock cycle. In its simplest embodiment, all instructions except for load and store act upon internal registers within the central processing unit. A load instruction is used to fetch data from external memory and place it in an internal register, and a store instruction is used to take the contents of an internal register and place it in external memory. RISC processors obtain higher speeds of operation by pipelining the instructions. Processors utilized to provide pipelined operations normally cycle through fetch, decode, execute, and write back steps of operation in executing each instruction. In a typical pipelined system, the individual instructions are overlapped so that an instruction executes once each clock cycle of the system.

One design of RISC computer is based on the Scalable Process Architecture (SPARC) designed by Sun Microsystems, Inc., Mountain View, Calif., and implemented in the line of SPARC computers manufactured by that company. One salient feature of the SPARC computers is the thirty-two bit instruction word used. As with most computers, instructions have addresses which direct you to particular positions in the computer and commands which tell the computer what to do. Essentially, an instruction directs the processor to perform an operation on the contents of the registers addressed by that instruction. In a SPARC computer, an instruction includes register addresses and commands. The normal instruction (called a register+register instruction) specifies two addresses of registers to be read, an operation to be performed on the data at those register addresses, and the address of a register in which the results of the operation are to be placed. Such instructions require that the register file associated with the computer have two read ports and one write port. As with other RISC computers, in none of these normal instructions does the processor of the SPARC computer go off-chip; it simply operates with information in the register file.

However, a load or store instruction is used to get data from memory or store it to memory. Such load and store instructions thus require the processor to access off-chip memory. The SPARC instructions accomplish this by designating two register addresses at which data is found. This data is added to form a memory address (as contrasted to a register address). For a load instruction, a third address designates the register to which the data at the memory address is to be written. For a store instruction, however, a third address designates the register which holds the information which is to be written to the addressed memory location. Thus, while most instructions in a SPARC computer are set up to read two registers and write to a third register, a store instruction reads three registers, two to determine a memory address, and the third to retrieve the data to be written to the addressed memory location. Hence, the store instruction requires three read ports since the third register must be read rather than written to derive the data to be stored.

Adding a read port is expensive. For this reason, SPARC computers typically execute a store operation in two clock cycles in order to obviate the need for an extra read port. During the first cycle, the first two registers are read and the memory address computed. During the second cycle, data from the register designated by the third address field is read out through one of the two read ports. This, of course, slows the operation of the computer.

SUMMARY OF THE INVENTION

It is, therefore, an object of the present invention to increase the speed of a SPARC based RISC computer in handling store operations.

It is another more specific object of the present invention to eliminate the need for an average of two clock cycles of processor time to accomplish a store operation in a SPARC based RISC computer.

These and other objects of the present invention are realized in a processor for a SPARC based RISC computer comprising a central processing unit including a register file having a pair of read ports and a write port, an instruction register for holding an instruction including addresses of registers to be read and written to, a multiplexor, and means for controlling the multiplexor to transfer the address from the write position of the instruction register to one of the read ports on the cycle after a store instruction.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associate with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1:
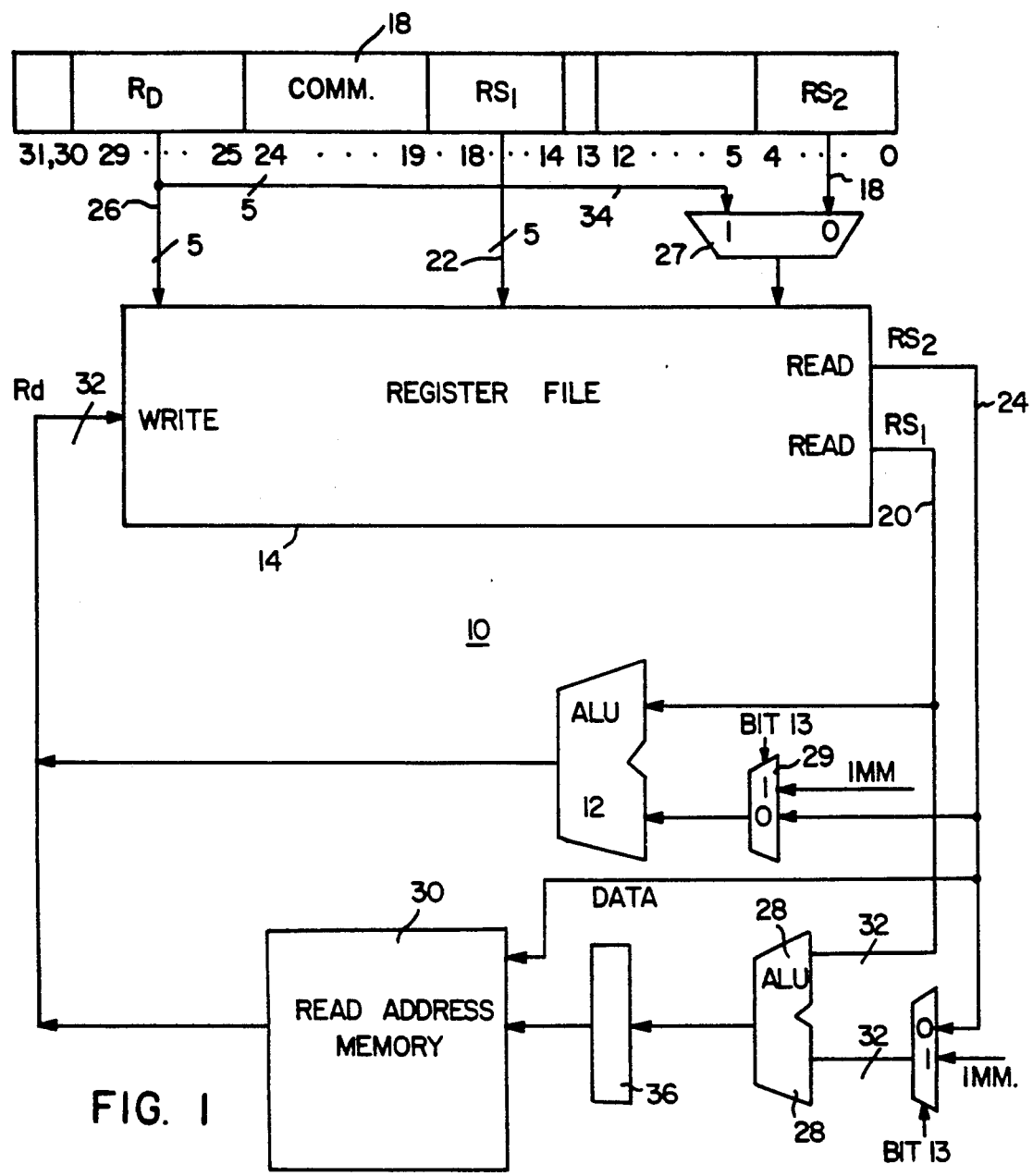
FIG. 1 is a block diagram illustrating a typical central processing unit of a prior art SPARC based RISC computer.

Referring now to FIG. 1, there is illustrated a block diagram of the central processing unit 10 of a typical SPARC based RISC computer of the prior art. The central processing unit 10 comprises an arithmetic and logic unit 12, a general register file 14 which may include at least thirty-two individual registers arranged in groups of eight global registers, eight local registers, eight IN registers, and eight OUT registers. The details of these registers are not pertinent to the explanation of this invention and are not, therefore, described hereafter. Also included are a number of control and status registers utilized for controlling the operation of the computer with which the central processing unit 10 is associated. Shown in FIG. 1 is a single register 16 which may be termed an instruction register and which holds the instruction being executed.

The register 16 includes thirty-two bit positions which may be designated as positions [31 . . . 0]. The register 16 illustrated holds a standard form of instruction in the SPARC format; such a format is termed a register+register (RR) format. Such an instruction includes in bit positions [4 . . . 0] the five bit address of a register which is to be read, in bit positions [18 . . . 14] the five bit address of another register which is to be read, in bit positions [24 . . . 19] the operation or command to be executed, and in bit positions [29 . . . 25] the five bit address of the register to be written to in a normal SPARC instruction execution. It should be noted that the five bits of each address are sufficient to designate thirty-two individual registers of the register file 14. Bit position [13] normally stores a zero to indicate that the format of the instruction is the RR format as described above.

In the normal execution of a SPARC RR format instruction, during a first clock cycle, the address held in bits [4 . . . 0] is transferred via five lines 18 and a multiplexor 27 to the register file 14 causing the read out of data on the thirty-two lines 24 from the addressed register. During the same clock cycle, the address held in bits [18 . . . 14] is transferred via the five lines 22 to the register file 14 causing the read out of data on the thirty-two lines 20 from the addressed register. A multiplexor 29 operates in response to a zero in bit position 13 of the instruction to transfer the data on lines 24 to the arithmetic and logic unit 12. The data on the lines 20 and 24 is manipulated by the arithmetic and logic unit 12 in accordance with the instruction and the result placed in the register of the register file 14 designated by the bits [29 . . . 25] of the instruction on the five lines 26.

In the execution of a SPARC store instruction, on the other hand, during a first clock cycle, the address held in bits [4 . . . 0] is transferred via five lines 18 to the register file 14 via the multiplexor 27 causing the read out of data on the thirty-two lines 24 from the addressed register. During the same clock cycle, the address held in bits [18 . . . 14] is transferred via the five lines 22 to the register file 14 causing the read out of data on the thirty-two lines 20 from the addressed register. The data on the lines 20 and 24 is manipulated by an address calculator arithmetic and logic unit 28 and placed in an address register 36 to provide the memory address at which information is to be stored in memory 30.

However, the information to be stored is held in a register of the register file 14; the address of that register is designated by the bits [29 . . . 25] of the instruction on the five lines 26. In the usual instruction, these bits designate a register to which data can be written using a write port of the register file 14. In contrast to the usual instruction, the information in the register addressed by these bits must be read rather than written. Therefore, the usual operation is to delay the execution by one cycle, and on the next cycle use multiplexor 27 to transfer address bits [29 . . . 25] to the register file 14 so that the information in the addressed register may be read on that second cycle from the read ports onto lines 24 for transfer to the memory 30. It should be noted that control of the multiplexor 27 to transfer the bits from positions [29 . . . 25] is exercised during a second store cycle.

Thus, the described prior art system executes the store instruction in two clock cycles, thereby obviating the need to add an additional read port to the file register 14.

The primary goal in the development of RISC computers or the like is to provide an instruction set solely comprised of instructions which fully execute in one clock cycle. More particularly, in light of the difficulty in developing such an instruction set, designers' goals now have been directed to developing an instruction set, comprised of instructions which when combined in a sequence execute in an average of one clock cycle per instruction. For example, an instruction sequence having four instructions would ideally execute in only four clock cycles even though one or more individual instructions requires more than one clock cycle to execute. As described below, the present invention comprises a central processing unit which strives to execute instructions in such a manner.

Figure 2:
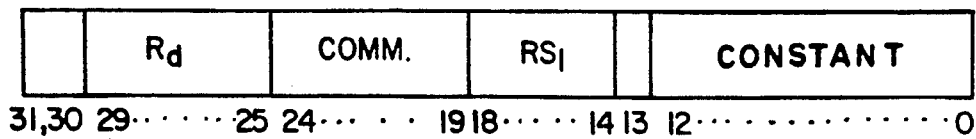
FIG. 2 is a diagram illustrating the positions of bits in a register+immediate format instruction held in a register in a typical SPARC based RISC computer.

The present invention eliminates the system delay caused by a two cycle store operation in approximately three-fourths of the store operations without increasing the number of read ports. First, it is necessary to understand that the SPARC instruction format provides another form of instruction termed a register+immediate (RI) format instruction. This format is illustrated in FIG. 2. The format is selected when the bit in position 13 of the instruction register 16 is a one. In this instruction format, the data contained in bits [12 . . . 0] is treated as a constant and manipulated with the data found in the register of the register file 14 addressed by bits [18 . . . 14]. This instruction is used for many if not most operations including loops in which a constant is added to or otherwise combined with a result to give a next result. Consequently, this form of instruction is much used in the operation of a SPARC processor. In fact, a RI format instruction has been found to occur as the next instruction following a store instruction in approximately three-fourths of all cases.

Since the RI format instruction only designates one register to be read from a read port of the register file 14 to form an address, one read port is left open during the execution of the instruction. This read port may be utilized by the store instruction in order to speed the operation of the central processing unit 10 in a SPARC based computer. This may be easily accomplished in a SPARC based computer because of its pipelining of instructions. That is, although two cycles are still necessary to accomplish the execution of the store instruction, the second cycle of the store instruction (during which the address designated by the bits in positions [29 . . . 25] is used to access a register in the register file 14 containing data to be transferred to memory) is overlapped with the next instruction in all cases in which the next cycle is of the RI format. Consequently, the total time required to execute the store and the following RI format instruction is two cycles in the execution phase of the operation, the same number as for executing two non-store instructions.

Figure 3:
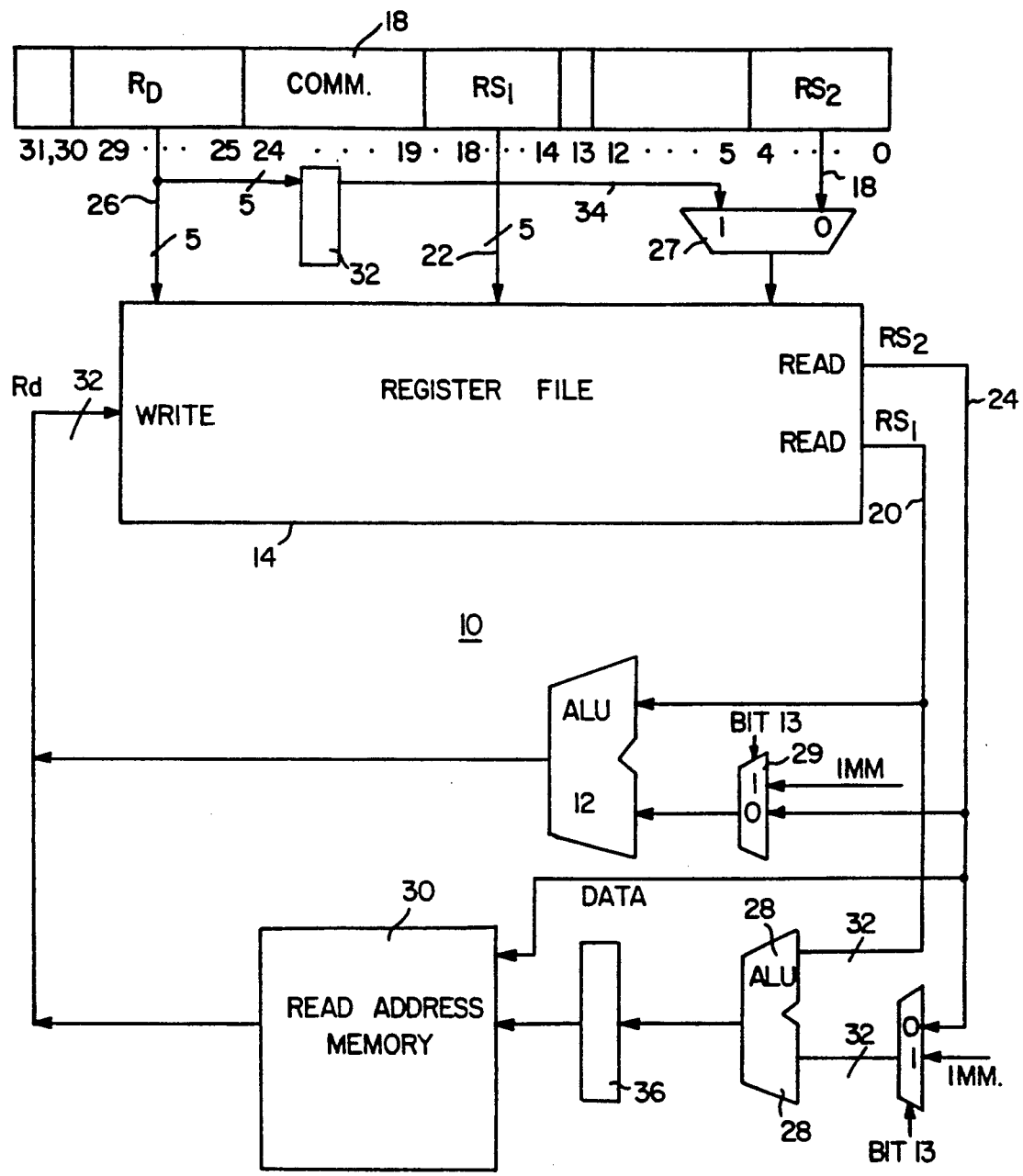
FIG. 3 is a block diagram illustrating a central processing unit of a SPARC based RISC computer constructed in accordance with the present invention.

FIG. 3 illustrates in block diagram form an improved central processing unit 10 constructed in accordance with the invention. The central processing unit 10 includes all of the elements illustrated in FIG. 1 and includes, in addition, a register 32 placed in the path from the lines 34 between the bit positions [29 . . . 25] and the multiplexor 27. During a first cycle of a store operation, the address information in bit positions [18 . . . 14] and [4 . . . 0] of the instruction register 16 is transferred to the register file 14 on the lines 22 and 18, (the data on the lines 18 via the multiplexor 27) in order to read out of the addressed registers the address data stored therein. This address data is then read out of the register file 14 through the read ports and onto lines 20 and 24. During the same cycle, register 32 receives input from the bit positions [29 . . . 25] on lines 34 and stores that data. This information is held in the register 32 as the next (non-store) instruction is placed into the register 16 on the next cycle clearing the register 16 of the store instruction.

On the second cycle of the store operation, the multiplexor 27 receives enabling input and the register address in bit positions [29 . . . 25] is transferred from the register 32 to the register file 14 via the multiplexor 27. This information accesses a register in the register file 14 containing the information to be stored. If the instruction in the register 16 at this time is of the RI format, no address information is included in the bit positions [4 . . . 0] to be transferred to the read port. Consequently, the data in the register file 14 addressed by bits [29 . . . 25] is transferred on the lines 24 to memory 30 during the same cycle that the data in the register file 14 addressed by the bits in positions [18 . . . 14] is manipulated by the arithmetic and logic unit 12 with the constant provided in bit positions [12 . . . 0]. Since it has been determined that instructions of the RI format occur in the next cycle following a store instruction in a typical SPARC based computer three-quarters of the time, the arrangement of the invention will, in general, produce what averages in a pipelined system to a one cycle store instruction three-quarters of the time.

In those cases in which the instruction following the store instruction is not of the RI format, the store instruction executes in the same manner. However, the second cycle of the store instruction utilizes the read port controlled by the multiplexor 27 so that the information in the bit positions [4 . . . 0] of the new instruction cannot be transferred to the register file 14. Consequently, the instruction following the store instruction must be reissued in such a case. This is accomplished by reading the bit 13 of the instruction in the instruction register 18 during the second cycle of the store operation; if the bit is a zero, this indicates that the instruction is an RR format instruction. When the bit 13 of the instruction following the store is a zero, the entire instruction is simply ignored, and the same instruction is placed in the register on the next cycle of operation. It should be noted that in such a case the store instruction executes in the same two cycle time which would be required by a more typical system so that the arrangement will not in any case be slower in executing a single store instruction than the prior art circuitry.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In a reduced instruction set computer (RISC) system comprising a first instruction having three read addresses and a second instruction having a read address, a data constant, and a write address, a central processing unit (CPU) for executing said first and second instruction in two clock cycles, said CPU comprising:

(a) first register means coupled to an instruction issuing unit of said RISC system for receiving said first and second instructions in a first and a second clock cycle as inputs, and in response, storing the first and second read addresses of said first instruction during said first clock cycle, said read address, data constant and write address of said second instruction during said second clock cycle, and the third read address of said first instruction during said first and second clock cycles, and outputting the first and second read addresses of said first instruction during said first clock cycle, the third read address of said first instruction and said read address, data constant, and write address of said second instruction during said second clock cycle;

(b) second register means coupled to said first register means for receiving the first and second read addresses of said first instruction during said first clock cycle, the third read address of said first instruction and said read address, data constant, and write address of said second instruction during said second clock cycle, and in response, outputting a first and a second data output during said first clock cycle, and a third and a fourth data output during said second clock cycle, and storing a data input during said second clock cycle;

(c) address generation means coupled to said second register means and a memory unit of said RISC system for receiving said first and second data output during said first clock cycle, and in response, generating a memory address for said memory unit during said first clock cycle;

(d) arithmetic means coupled to said first and second register means for receiving said fourth data output and data constant during said second clock cycle, and in response, generating said data input for said second register means during said second clock cycle, said third data output being received by said memory unit during said second clock cycle.

2. The CPU as set forth in claim 1, wherein, said first register means comprises:

(a.1) an instruction register coupled to said instruction issuing unit, said second register means, and said arithmetic means for receiving and storing said first and second instructions during said first and second clock cycles, outputting for said second register means said first and second read addresses of said first instruction during said first clock cycle, and said read and write addresses of said second instruction during said second clock cycle, outputting for said arithmetic means said data constant of said second instruction during said second clock cycle, and outputting said third read address of said first instruction when transitioning from said first clock cycle to said second clock cycle;

(a.2) a carryover register coupled to said instruction register for receiving said third read address of said first instruction when transitioning from said first clock cycle to said second clock cycle, storing and outputting said third read address of said first instruction during said second clock cycle; and (a.3) a multiplexor coupled to said instruction register and said carryover register for selecting said carryover register, and outputting for said second register means said third read address of said first instruction during said second clock cycle.

3. The CPU as set forth in claim 1, wherein, said RISC system further comprises a third instruction having at least two read addresses, and said third instruction is issued by said instruction issuing unit in lieu of said second instruction during said second clock cycle, said first register means, during said second clock cycle, receiving said third instruction in lieu of said second instruction, storing said at least two read addresses of said third instruction in lieu of said read address, data constant, and write address of said second instruction, and outputting a notification signal indicating to said instruction issuing unit the necessity of reissuing said third instruction in lieu of said read address, data constant, and write address of said second instruction;

said second register means, during said second clock cycle, receiving only said third read address of said first instruction, outputting only said third data output, and storing no data input; and said arithmetic means, during said second clock cycle, performing no operation.

4. A reduced instruction set computer (RISC) system comprising:

(a) instruction issuing means for issuing a first instruction having three read addresses and a second instruction having a read address, a data constant, and a write address;

(b) a central processing unit (CPU) for executing said first and second instruction in two clock cycles, said CPU comprising (b.1) first register means coupled to said instruction issuing means for receiving said first and second instructions in a first and a second clock cycle as inputs, and in response, storing the first and second read addresses of said first instruction during said first clock cycle, said read address, data constant and write address of said second instruction during said second clock cycle, and the third read address of said first instruction during said first and second clock cycles, and outputting the first and second read addresses of said first instruction during said first clock cycle, the third read address of said first instruction and said read address, data constant, and write address of said second instruction during said second clock cycle;

(b.2) second register means coupled to said first register means for receiving the first and second read addresses of said first instruction during said first clock cycle, the third read address of said first instruction and said read address, data constant, and write address of said second instruction during said second clock cycle, and in response, outputting a first and a second data output during said first clock cycle, and a third and a fourth data output during said second clock cycle, and storing a data input during said second clock cycle;

(b.3) address generation means coupled to said second register means for receiving said first and second data output during said first clock cycle, and in response, generating a memory address during said first clock cycle;

(b.4) arithmetic means coupled to said first and second register means for receiving said fourth data output and data constant during said second clock cycle, and in response, generating said data input for said second register means during said second clock cycle;

(c) memory means coupled to said address generation means and said second register means for receiving said memory address during said first clock cycle, receiving and storing said third data output in accordance to said previously received memory address during said second clock cycle.

5. The RISC system as set forth in claim 4, wherein, said first register means comprises:
(b.1.1) an instruction register coupled to said instruction issuing means, said second register means, and said arithmetic means for receiving and storing said first and second instructions during said first and second clock cycles, outputting for said second register means said first and second read addresses of said first instruction during said first clock cycle, and said read and write addresses of said second instruction during said second clock cycle, outputting for said arithmetic means said data constant of said second instruction during said second clock cycle, and outputting said third read address of said first instruction when transitioning from said first clock cycle to said second clock cycle;
(b.1.2) a carryover register coupled to said instruction register for receiving said third read address of said first instruction when transitioning from said first clock cycle to said second clock cycle, storing and outputting said third read address of said first instruction during said second clock cycle; and
(b.1.3) a multiplexor coupled to said instruction register and said carryover register for selecting said carryover register, and outputting for said second register means said third read address of said first instruction during said second clock cycle.

6. The RISC system as set forth in claim 4, wherein, said instruction issuing means, during said second clock cycle, issues a third instruction having at least two read addresses in lieu of said second instruction;
said first register means, during said second clock cycle, receiving said third instruction in lieu of said second instruction, storing said at least two read addresses of said third instruction in lieu of said read address, data constant, and write address of said second instruction, and outputting a notification signal indicating to said instruction issuing means the necessity of reissuing said third instruction in lieu of said read address, data constant, and write address of said second instruction;
said second register means, during said second clock cycle, receiving only said third read address of said first instruction, outputting only said third data output, and storing no data input; and
said arithmetic means, during said second clock cycle, performing no operation.

* * * * *